United States Patent

[11] 3,614,496

| [72] | Inventor | Lodewijk Schiethart Dubbeldam, Netherlands |
|---|---|---|
| [21] | Appl. No. | 2,195 |
| [22] | Filed | Jan. 12, 1970 |
| [45] | Patented | Oct. 19, 1971 |
| [73] | Assignee | N.V. Electromotorenfabriek Dordt Dordrecht, Netherlands |
| [32] | Priority | Jan. 17, 1969 |
| [33] | | Netherlands |
| [31] | | 6900864 |

[54] SYNCHRONOUS ELECTRIC MOTOR
6 Claims, 5 Drawing Figs.

[52] U.S. Cl............................................. 310/162, 310/68, 310/211
[51] Int. Cl.................................................. H02k 19/00
[50] Field of Search............................................. 310/162, 163, 164, 211, 125, 127, 217, 218, 54, 114, 112, 113, 68, 68.3, 165; 318/254

[56] References Cited
UNITED STATES PATENTS

| 2,191,158 | 2/1940 | Potter | 310/68.3 |
| 2,202,172 | 5/1940 | Stoller | 310/113 |
| 2,480,844 | 9/1949 | Fox | 310/113 |
| 3,206,623 | 9/1965 | Snowdon | 310/162 |
| 3,226,582 | 12/1965 | Beckwith | 310/211 |
| 3,456,141 | 7/1969 | Burgess | 310/114 |
| 3,510,699 | 5/1970 | Fredrickson | 310/114 |

*Primary Examiner*—D. F. Duggan
*Assistant Examiner*—R. Skudy
*Attorney*—Imirie, Smiley, Snyder and Butrum ABSTRACT: The rotor of a synchronous electric motor includes an enlarged shaft portion of magnetic material upon which a pair of squirrel cage winding and pole piece assemblies are mounted in spaced relation with a spacer ring of magnetic material disposed between the assemblies. The laminations of the pole pieces are sandwiched between the end plates of the squirrel cage windings and the radially projecting poles receive some of the conducting bars joining the end plates. The main body portions of the laminations are annular, having substantially the same outer diameter as the spacer ring, and are notched to receive those conducting bars which do not pass through the poles.

INVENTOR
LODEWIJK SCHEDHART
BY
ATTORNEY

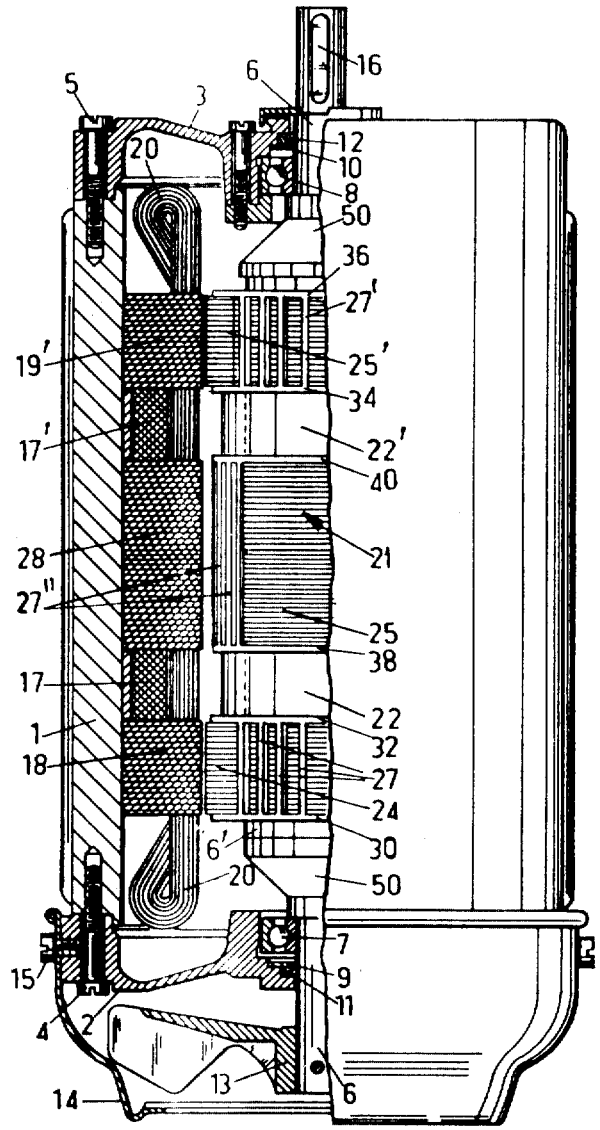
FIG. 3
FIG. 4
FIG. 5
INVENTOR
BY
ATTORNEY

SYNCHRONOUS ELECTRIC MOTOR

BACKGROUND OF THE INVENTION

Certain synchronous electric motors of the so-called inductor type are known to possess the inherent advantages of eliminating the need for a rotating winding so that elements such as sliprings, brushes, etc. are not required but they are also known to be propense to the problem of magnetic leakage. An example of this type of motor is to be found in U.S. Pat. No. 2,073,760 of Mar. 16, 1937.

BRIEF SUMMARY OF THE INVENTION

The present invention is directed to a synchronous motor of the above type employing an improved form of rotor construction which minimizes magnetic leakage losses, which operates with favorable power factor and efficiency, and which operates during starting as an asynchronous motor with favorable starting characteristics, especially where operating with higher frequencies.

Essentially, the rotor construction embodies combined squirrel cage winding and pole piece assemblies of simple, rugged and economical construction. Two or more of these assemblies are mounted on an enlarged magnetically conductive shaft portion and between each pair of them is placed a spacer ring of magnetic material. This arrangement favorably accommodates for the high magnetic flux density employed and tends to minimize magnetic leakage. The pole pieces are formed as laminations each of which has an annular main body portion with two or more radially projecting poles, the spacer rings being of an outer diameter similar to the outer diameter of the main body portions of the laminations. The end plates of the squirrel cage windings sandwich the laminations of the pole pieces between them and they are joined by evenly spaced conducting bars, some of which extend through the poles and intervening ones of which may be received in notches in the main body portions of the pole piece laminations. This not only results in a simple, rugged and economical construction, but also provides the rotor with squirrel cage conducting bars of different reactance at starting which favorably influences the starting characteristics. Shielding against magnetic leakage is achieved not only by the use of nonmagnetic opposite end portions of the rotor shaft, but by the use of casing end shields and by spaced sleeves extending from the opposite ends of the enlarged magnetic portion of the shaft to these casing end shields.

BRIEF DESCRIPTION OF THE DRAWINGS

FIG. 3 is a perspective diagram, partly in section, of another embodiment of the invention;

FIG. 4 shows a diagram of two mechanically coupled switches, in which the DC supply of the field winding is switched on simultaneously with the AC supply; and FIG. 5 shows a diagram in which the switch of the DC supply of the field winding is actuated with a delay with respect to the actuated of the AC supply.

DETAILED DESCRIPTION OF THE INVENTION

Figure 1:
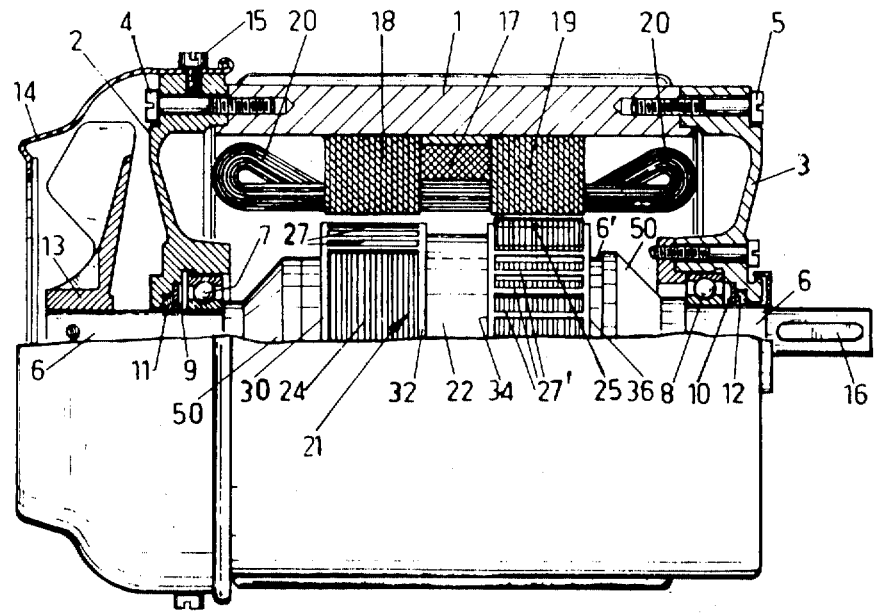
FIG. 1 is a perspective diagram partly in section, of a motor with four poles according to the invention.
Figure 2:
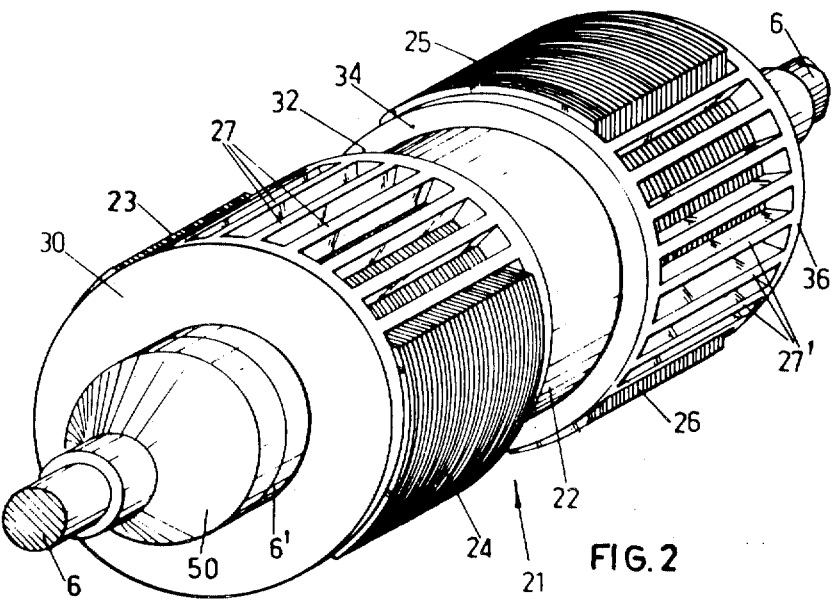
FIG. 2 is a diagram of the rotor in the motor according to the invention.

The stationary part or stator of the motor includes a substantially cylindrical housing 1 provided at opposite ends with shields 2 and 3 which are connected to the housing 1 by means of bolts 4, 5 respectively. The shields 2 and 3 are provided with central openings receiving ball bearings 7, 8 for rotatably supporting the rotor shaft 6 in the shields 2, 3, the ball bearings 7, 8 being covered by means of the respective shields 19 and 20 and suitable felt dust seals 11 and 12. That end of the shaft to the left as viewed in FIG. 1, is provided with a blade wheel 13 which serves as a fan device and this blade wheel 13 is shielded by a plate 14, which is fastened to the housing 1 by means of bolts 15. The opposite end of the shaft is provided with a suitable keyway 16. The DC winding 17 serves to excite the motor. On both sides of a space ring member enclosing the winding 17, laminated core structures 18 and 19 are provided bearing a polyphase winding 20. This polyphase winding 20 is composed of coils or groups of coils, having a width along the boring in tangential direction, substantially corresponding with the coil pitch of different polarity. By means of this winding 20 a rotating field is excited.

The rotor shaft includes the opposite end portions 6 which are of nonmagnetic material and, as well, an enlarged intermediate portion 6' which is of magnetic material. On this intermediate portion a pair of combined squirrel cage winding-pole piece assemblies are mounted. One of the squirrel cage windings includes opposite end plates 30 and 32 joined by conducting bars 27 and which are short-circuited by the end plates, while the other winding comprises the end plates 34 and 36 and conducting bars 27'. Sandwiched between each pair of end plates are laminations forming the pole pieces, each lamination having an annular main body portion provided with two or more radially projecting portions. The radially projecting portions of one pole piece present the poles 23 and 24 while the radially projecting portions of the other pole piece present the poles 25 and 26. The sets of poles are staggered to provide a symmetrical arrangement, being disposed in orthogonal planes passing through the axis of the rotor shaft.

The outer edges of the main body portions of the pole piece laminations between the pole pieces are notched to receive the inner edges of their respective conducting bars 27 and 27' and the widths of the pole pieces are commensurate with the widths of the core members 18 and 19 with which they are aligned, so that the end plates 30 and 32 lie in planes substantially straddling the core member 18 while the end plates 34 and 36 lie in planes substantially straddling the core member 19.

Each squirrel cage-pole piece assembly is of rugged yet simple and economical unitary construction and may be suitably assembled onto the intermediate portion 6' of the rotor shaft. Between these two assemblies in embracing relation to the shaft portion 6' is a spacer ring 22 of magnetic material whose outer diameter is substantially the same as the outer diameter of the main body portion of each pole piece lamination and which is of a width properly to orient the assemblies as aforesaid. To complete the rotor, axial spacer sleeves 50 are provided between the opposite end faces of the intermediate portion 6' of the rotor shaft, extending to the respective shields 2 and 3 and engaging the bearings thereby axially to position the rotor and to enhance the magnetic shielding effect.

The concentric exciting winding 17 conducts a direct current and excites an axially directed DC field in the housing and the shaft, closing through the core structures of the stator and the poles. The polarity of the poles on the rotor depends on the direction of this field. The rotating fields excited by means of the winding 20 will, owing to the squirrel winding, impart an asynchronous rotational movement to the rotor, whereby after the start and the exitation of the field winding the rotor, owing to the protruding poles, rotates synchronously with the rotating field on the stator. It is an advantage of the motor that without exciting windings on the rotor being fed by means of slip rings, a controllable exciting field is provided.

FIG. 3, wherein the like reference numbers indicate the like parts as in FIG. 1, illustrates a modification in the arrangement and position of the exciting windings. Two axially spaced field exciting windings 17, 17' are provided with a common laminated core structure 28. On the rotor four planes, each containing a pair of pole structures, are situated opposite to the core structures on the stator. Between end plates 30, 32; 38, 40; 34 and 36 electrically conductive rods 27; 27''; 27' respectively are extending. On the rotor axis three pole pieces 24, 25 and 25' are positioned. Pole piece 25 in axial direction is about two times as long as each of the pole pieces 24, 25'. In this way a motor with a relative large power is obtained.

The diagram according to FIG. 4 shows a circuit in which the switches 41, 42 in the AC supply and the DC supply respectively are mechanically coupled, so that the DC supply is switched on and the field winding is excited simultaneously with the polyphase winding. This arrangement will be employed if the DC field is of relative small strength.

FIG. 5 shows a diagram in which by means of a delay time relay 43 the switch 44 will be actuated a certain time interval after the switch 45 has been actuated by actuating the start switch in the form of a push button 46. The motor can be switched off by breaking the circuit with the help of switch 47. This arrangement will be applied if a relative large DC field excitation is employed. With this arrangement the motor will start asynchronously by means of the squirrel cage winding and after switch 44 is actuated the motor will rotate synchronously with the polyphase field. With a motor according to the invention, employing squirrel case windings, it is possible to start the motor asynchronously and after the rotor has started to excite the DC field winding the motor will rotate synchronously with the rotating AC field. Employing a squirrel cage winding also provides advantages with respect to the damping of the motor.

The motor according to the invention may be easily and cheaply assembled because of the simple structure of the rotor without excitation windings, brushes and slip rings on the rotor.

What is claimed is:

1. A synchronous electric motor comprising a casing, at least a pair of axially spaced annular core members fixed within said casing, field winding means disposed between said core members for establishing a closed DC magnetic field extending axially within said casing and passing radially through said core members and circumferentially of the casing for establishing a rotating field within said casing, a rotor journaled in said casing concentrically of said core members and said winding means, said rotor including a shaft, squirrel cage winding means fixed to said shaft and including circumferentially spaced electrically conducting rods and remote end plates disposed in planes substantially straddling said core members, and a pair of pole pieces within the confines of said squirrel cage winding means and having radially projecting poles pierced by some said rods; and means for exciting said field windings to establish magnetic lock between said poles and the rotating polyphase field after said rotor has been started by asynchronous inductive interaction between said rotating polyphase field and said squirrel cage windings.

2. A synchronous electric motor comprising a casing, at least a pair of axially spaced annular core members fixed within said casing, field winding means disposed between said core members for establishing a closed DC magnetic field extending axially within said casing and passing radially through said core members, and polyphase winding means extending through said core members and circumferentially of the casing for establishing a rotating field within said casing, a rotor journaled in said casing concentrically of said core members and said winding means, said rotor comprising a shaft, a first pair of electrically conductive end plates surrounding said shaft in axially spaced relation and oriented in planes substantially straddling one of said core members, a first series of electrically conducting rods extending between and joining said first pair of end plates to form a first squirrel cage winding therewith, a second pair of end plates surrounding said shaft in axially spaced relation and orientated in planes substantially straddling the other of said core members, a second series of electrically conducting rods extending between and joining said second pair of end plates to form a second squirrel cage winding therewith, a spacer of material having good magnetic conductivity disposed between the adjacent end plates of said two squirrel cage windings, a first pole piece disposed between said first pair of end plates and having poles disposed adjacent said one core member, a second pole piece disposed between said second pair of end plates and having poles adjacent said other core member, the poles of the two pole pieces being disposed in circumferentially staggered radial planes with respect to the axis of said shaft, and means for exciting said field winding to establish magnetic lock between said poles and the rotating polyphase field after said rotor has been started by asynchronous inductive interaction between said rotating polyphase field and said squirrel cage windings.

3. The synchronous motor as defined in claim 2 wherein said casing is provided with a third annular core member intermediate said pair of core members and of axial length substantially equal to the cumulative lengths of said pair of core members, and a second field winding is provided, the first field winding being disposed between one of said pair of core members and said third core member and the second field winding being disposed between the other of said pair of core members and said third core member, a third squirrel cage winding including a third pair of end plates disposed in planes substantially straddling said third core member circumferentially spaced rods joining said third pair of end plates, and a further pole piece disposed between said third pair of end plates and including poles adjacent said third core member and staggered with respect to the other of said poles.

4. A synchronous electric motor comprising a casing including opposite end shields, at least a pair of axially spaced annular core members fixed within said casing, field winding means disposed between said core members for establishing a closed DC magnetic field extending axially within said casing and passing radially through said core members for establishing a rotating field within said casing, a rotor journaled in said casing concentrically of said core members and said winding means, said rotor comprising a shaft having an enlarged intermediate portion of magnetic material and opposite end portions of nonmagnetic material projecting through and journaled in said shields, first and second squirrel cage windings and carried by said intermediate portion of the shaft, said first squirrel cage winding comprising a pair of axially spaced electrically conductive annular end plates disposed in planes straddling one of said core members and a series of uniformly spaced conducting bars joining such end plates, said second squirrel cage winding comprising a pair of axially spaced electrically conductive annular end plates disposed in planes straddling the other of said core members and a series of uniformly spaced conducting bars joining such end plates, first and second pole pieces respectively sandwiched between said first and second squirrel cage windings, each pole piece comprising a series of laminations, each of which includes an annular main body portion embracing said intermediate portion of the shaft and having circumferentially spaced radially projecting poles provided with openings receiving certain of said conducting bars, magnetically conducting spacer means disposed around said intermediate portion of the shaft between said squirrel cage windings and having an outer diameter substantially equal to the outer diameter of said main body portions of the laminations, and means for exciting said field winding to establish magnetic lock between said poles and the rotating polyphase field after said rotor has been started by asynchronous inductive interaction between said rotating polyphase field and said squirrel cage windings.

5. The synchronous motor as defined in claim 4 wherein said main body portions of the laminations are notched to receive inner side portions of said conducting bars.

6. The synchronous motor as defined in claim 5 including spacer sleeves extending from the opposite ends of said intermediate portion of the shaft to said end shields.